United States Patent
Konda et al.

(10) Patent No.: US 11,619,025 B2
(45) Date of Patent: Apr. 4, 2023

(54) LOADING MACHINE CONTROL DEVICE AND CONTROL METHOD

(71) Applicant: Komatsu Ltd., Tokyo (JP)

(72) Inventors: Tomoki Konda, Tokyo (JP); Yusuke Saigo, Tokyo (JP); Ryuta Okuwaki, Tokyo (JP); Kazuhiro Hatake, Tokyo (JP)

(73) Assignee: Komatsu Ltd., Tokyo (JP)

( * ) Notice: Subject to any disclaimer, the term of this patent is extended or adjusted under 35 U.S.C. 154(b) by 389 days.

(21) Appl. No.: 16/652,773

(22) PCT Filed: Feb. 27, 2019

(86) PCT No.: PCT/JP2019/007513
§ 371 (c)(1),
(2) Date: Apr. 1, 2020

(87) PCT Pub. No.: WO2019/168012
PCT Pub. Date: Sep. 6, 2019

(65) Prior Publication Data
US 2020/0248434 A1    Aug. 6, 2020

(30) Foreign Application Priority Data
Feb. 28, 2018   (JP) .............................. JP2018-035663

(51) Int. Cl.
*E02F 9/20* (2006.01)
*B65G 65/00* (2006.01)
(Continued)

(52) U.S. Cl.
CPC .......... *E02F 9/2033* (2013.01); *B65G 65/005* (2013.01); *B65G 67/04* (2013.01);
(Continued)

(58) Field of Classification Search
None
See application file for complete search history.

(56) References Cited

U.S. PATENT DOCUMENTS 10,450,722 B2 * 10/2019 Moriki .................. E02F 9/2004
10,494,788 B2 * 12/2019 Glasser ................... E02F 9/121
(Continued)

FOREIGN PATENT DOCUMENTS

| JP | 63194031 A | 8/1988 |
| JP | A-07-071054 | 3/1995 |

(Continued)

*Primary Examiner* — Jonathan M Dager
(74) *Attorney, Agent, or Firm* — Fish & Richardson P.C.

(57) ABSTRACT

A control device outputs an operation signal of a work equipment and a swing body for moving a work equipment to a loading point when receiving a loading command signal. The control device does not output a dumping operation signal for causing the bucket to dump earth in a case where an azimuth direction in which the swing body faces is within a first region from a starting point azimuth direction to a predetermined reference azimuth direction, the starting point azimuth direction being an azimuth direction in which the swing body faces when the loading command signal is received. The control device outputs the dumping operation signal in a case where the azimuth direction is within a second region from the reference azimuth direction to an end point azimuth direction in which the swing body faces when the work equipment is positioned at the loading point.

6 Claims, 5 Drawing Sheets

(51) Int. Cl.
*B65G 67/04* (2006.01)
*E02F 3/30* (2006.01)
*E02F 3/43* (2006.01)

(52) U.S. Cl.
CPC .............. *E02F 3/308* (2013.01); *E02F 3/439* (2013.01); *E02F 9/2004* (2013.01); *E02F 9/2041* (2013.01)

(56) References Cited

U.S. PATENT DOCUMENTS

| | | | | |
|---|---|---|---|---|
| 11,306,460 | B2* | 4/2022 | Nakamura | E02F 3/32 |
| 11,340,079 | B1* | 5/2022 | Ebrahimi Afrouzi | G06V 20/56 |
| 11,434,624 | B2* | 9/2022 | Tsukamoto | E02F 9/262 |
| 2009/0204259 | A1* | 8/2009 | Danko | G05B 13/024 700/250 |
| 2014/0257647 | A1* | 9/2014 | Wu | E02F 9/24 701/50 |
| 2016/0224026 | A1* | 8/2016 | Hamada | E02F 9/2004 |
| 2016/0281323 | A1 | 9/2016 | Imaizumi | |
| 2017/0073935 | A1* | 3/2017 | Friend | E02F 9/265 |
| 2017/0328031 | A1* | 11/2017 | Jang | E02F 9/265 |
| 2018/0174377 | A1* | 6/2018 | Collins | E02F 9/261 |
| 2020/0199853 | A1* | 6/2020 | Konda | E02F 3/32 |
| 2020/0224385 | A1* | 7/2020 | Saigo | E02F 3/439 |
| 2020/0232185 | A1* | 7/2020 | Saigo | E02F 3/439 |
| 2020/0263385 | A1* | 8/2020 | Konda | E02F 3/437 |
| 2020/0283993 | A1* | 9/2020 | Minagawa | E02F 3/439 |
| 2020/0299929 | A1* | 9/2020 | Ohiwa | E02F 9/265 |
| 2021/0012163 | A1* | 1/2021 | Li | E02F 9/261 |
| 2021/0102357 | A1* | 4/2021 | Okuwaki | E02F 9/123 |
| 2021/0110488 | A1* | 4/2021 | Onishi | E02F 9/2054 |
| 2021/0156114 | A1* | 5/2021 | Saigo | F15B 7/001 |
| 2021/0164192 | A1* | 6/2021 | Konda | E02F 3/439 |
| 2021/0246625 | A1* | 8/2021 | Oi | E02F 9/26 |
| 2021/0254304 | A1* | 8/2021 | Konda | E02F 9/2041 |
| 2021/0262190 | A1* | 8/2021 | Ito | E02F 9/2282 |
| 2021/0292998 | A1* | 9/2021 | Kawamoto | G06T 7/73 |
| 2022/0025615 | A1* | 1/2022 | Kanari | E02F 9/2004 |
| 2022/0101552 | A1* | 3/2022 | Kawamoto | G06T 7/11 |
| 2022/0127817 | A1* | 4/2022 | Sano | E02F 9/265 |
| 2022/0220695 | A1* | 7/2022 | Izumi | E02F 9/26 |

FOREIGN PATENT DOCUMENTS

| | | |
|---|---|---|
| JP | A-09-111811 | 4/1997 |
| JP | A-09-256407 | 9/1997 |
| JP | A-2011-094453 | 5/2011 |
| JP | 2016089559 A | 5/2016 |
| JP | A-2016-183449 | 10/2016 |
| JP | A-2017-227012 | 12/2017 |
| WO | 2013057758 | 4/2013 |
| WO | 2015129932 | 9/2015 |

* cited by examiner

LOADING MACHINE CONTROL DEVICE AND CONTROL METHOD

CROSS-REFERENCE TO RELATED APPLICATIONS

This application is a National Stage application under 35 U.S.C. § 371 of International Application No. PCT/JP2019/007513, filed on Feb. 27, 2019, which claims priority to Japanese Patent Application No. 2018-035663, filed on Feb. 28, 2018. The contents of the prior applications are incorporated herein in their entirety.

TECHNICAL FIELD

The present invention relates to a loading machine control device and a control method.

BACKGROUND ART

PTL 1 discloses a technique related to automatic loading control of a loading machine. The automatic loading control means control performed for moving a bucket to a loading point by receiving designation of the loading point from an operator or the like of a loading machine by a control device, and by controlling an operation of the loading machine and a work equipment using the control device. According to the technique of PTL 1, the control device stores a time series of a position of the work equipment in advance and operates the work equipment according to the time series.

CITATION LIST

Patent Literature

[PTL 1] Japanese Unexamined Patent Application, First Publication No. H09-256407

DISCLOSURE OF INVENTION

Technical Problem

According to the technique described in PTL 1, the work equipment automatically moves to a loading point stored in advance, and earth is dumped at the loading point. In order to shorten the cycle time, there is a desire to start the dumping operation before the bucket reaches the loading point. In this case, it is preferable to prevent the dumping operation from being performed when the bucket is not on the loading object, and the earth from spilling from a loading object.

An object of the present invention is to provide a loading machine control device and a control method that can receive a dumping operation by an operator in automatic loading control and can prevent earth from spilling from a loading object.

Solution to Problem

A first aspect of the present invention provides a control device for controlling a loading machine including a swing body that swings around a center of swing and a work equipment that is attached to the swing body and has a bucket, the control device including: an operation signal input unit that is configured to receive an input of a dumping operation signal and a loading command signal for causing the bucket to dump earth from an operator; and an operation signal output unit that is configured to output an operation signal of the work equipment and the swing body for moving the bucket to a loading point in a case where the loading command signal is received, is configured to prohibit an output of the dumping operation signal when the dumping operation signal is received in a case where an azimuth direction in which the swing body faces is included in a first region from a starting point azimuth direction to a predetermined reference azimuth direction, the starting point azimuth direction being an azimuth direction in which the swing body faces when the loading command signal is received, and is configured to output the dumping operation signal when the dumping operation signal is received in a case where the azimuth direction in which the swing body faces is included in a second region from the reference azimuth direction to an end point azimuth direction which is an azimuth direction in which the swing body faces when the work equipment is positioned at the loading point.

Advantageous Effects of Invention

According to the above-described aspect, the loading machine control device can receive a dumping operation by automatic loading control and prevent earth from spilling from a loading object.

BEST MODE FOR CARRYING OUT THE INVENTION

Hereinafter, embodiments will be described with reference to the drawings.

First Embodiment

<<Configuration of Loading Machine>>

Figure 1:
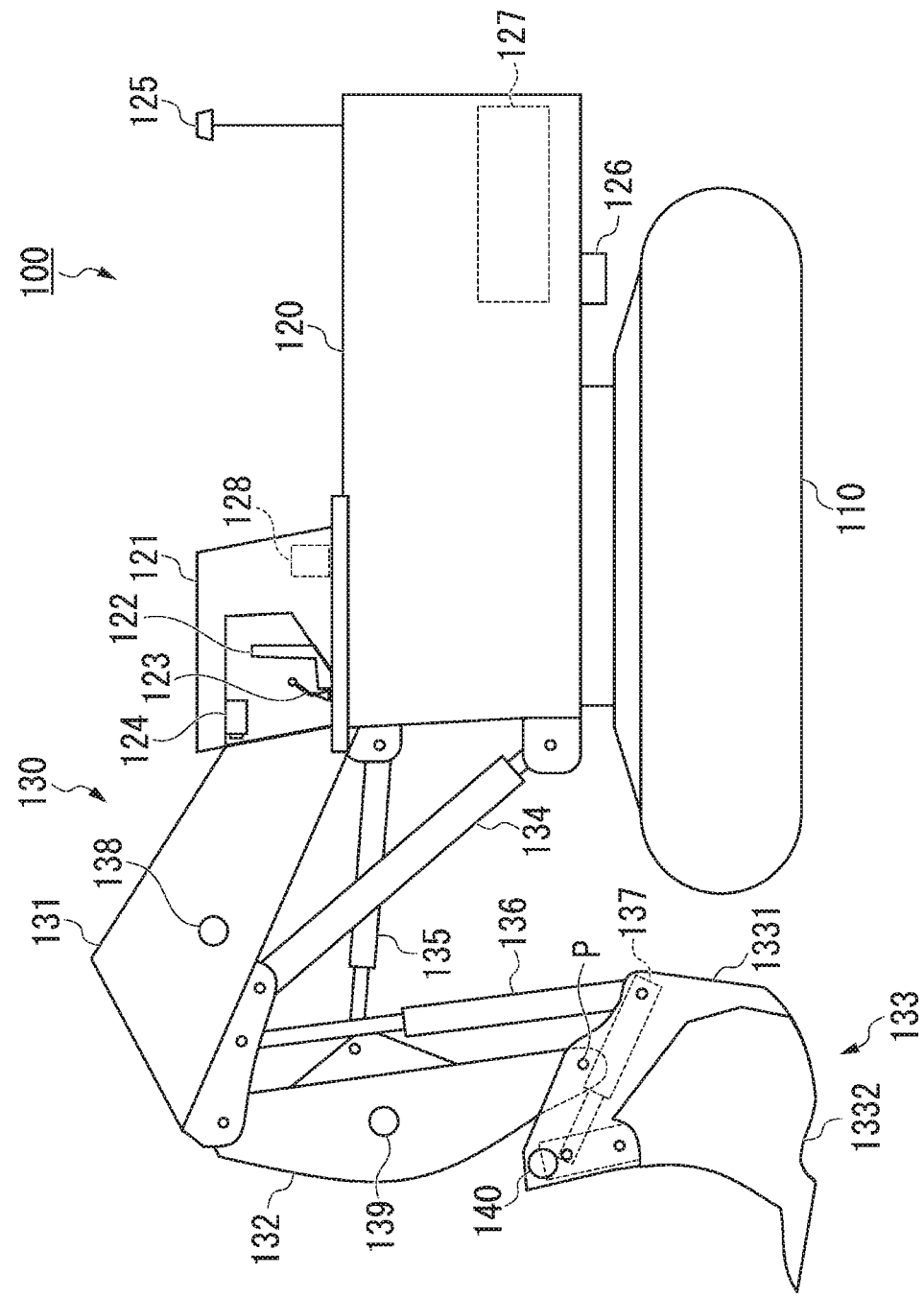
FIG. 1 is a schematic view showing a configuration of a loading machine according to a first embodiment.

FIG. 1 is a schematic view showing a configuration of a loading machine according to a first embodiment.

A loading machine 100 is a work machine for loading earth to a loading point, such as a transport vehicle. The loading machine 100 according to the first embodiment is a hydraulic shovel. The loading machine 100 according to another embodiment may be a loading machine other than a hydraulic shovel. In addition, the loading machine 100 shown in FIG. 1 is a face shovel, but may be a backhoe shovel or a rope shovel.

The loading machine 100 includes a traveling body 110, a swing body 120 supported by the traveling body 110, and a work equipment 130 operated by hydraulic pressure and supported by the swing body 120. The swing body 120 is supported so as to be swingable around a center of swing.

The work equipment 130 includes a boom 131, an arm 132, a clam bucket 133, a boom cylinder 134, an arm cylinder 135, a bucket cylinder 136, a clam cylinder 137, a boom angle sensor 138, an arm angle sensor 139, and a bucket angle sensor 140.

A base end portion of the boom 131 is attached to the swing body 120 via a pin.

The arm 132 connects the boom 131 and the clam bucket 133 to each other. A base end portion of the arm 132 is attached to a tip end portion of the boom 131 via a pin.

The clam bucket 133 includes a backhaul 1331 attached to a tip end portion of the arm 132 via a pin, and a clamshell 1332 having a blade for excavating earth. The backhaul 1331 and the clamshell 1332 are connected to each other via a pin so as to be opened and closed. When the backhaul 1331 and the clamshell 1332 are closed, the backhaul 1331 and the clamshell 1332 function as a container for accommodating the excavated earth. On the other hand, when the backhaul 1331 and the clamshell 1332 are opened, the contained earth can be dumped.

The boom cylinder 134 is a hydraulic cylinder for operating the boom 131. A base end portion of the boom cylinder 134 is attached to the swing body 120. A tip end portion of the boom cylinder 134 is attached to the boom 131.

The arm cylinder 135 is a hydraulic cylinder for driving the arm 132. A base end portion of the arm cylinder 135 is attached to the boom 131. A tip end portion of the arm cylinder 135 is attached to the arm 132.

The bucket cylinder 136 is a hydraulic cylinder for driving the clam bucket 133. A base end portion of the bucket cylinder 136 is attached to the boom 131. A tip end portion of the bucket cylinder 136 is attached to the backhaul 1331 of the clam bucket 133.

The clam cylinder 137 is a hydraulic cylinder for opening and closing the backhaul 1331 and the clamshell 1332. A base end portion of the clam cylinder 137 is attached to the backhaul 1331. A tip end portion of the clam cylinder 137 is attached to the clamshell 1332.

The boom angle sensor 138 is attached to the boom 131 and detects an inclination angle of the boom 131.

The arm angle sensor 139 is attached to the arm 132 and detects an inclination angle of the arm 132.

The bucket angle sensor 140 is attached to the backhaul 1331 of the clam bucket 133 and detects an inclination angle of the clam bucket 133.

The boom angle sensor 138, the arm angle sensor 139, and the bucket angle sensor 140 according to the first embodiment detect the inclination angle with respect to a ground plane. In addition, the angle sensor according to another embodiment is not limited thereto, and may detect the inclination angle with respect to another reference plane. For example, in another embodiment, the angle sensor may detect a relative rotation angle with a potentiometer provided at the base end portions of the boom 131, the arm 132, and the clam bucket 133, or may detect the inclination angle by measuring the cylinder lengths of the boom cylinder 134, the arm cylinder 135, and the bucket cylinder 136, and by converting the cylinder length into an angle.

The swing body 120 is provided with a cab 121. Inside the cab 121, a driver seat 122 for an operator to sit on, an operation device 123 for operating the loading machine 100, and a detection device 124 for detecting a three-dimensional position of an object that is present in a detecting direction, are provided. In response to an operation of the operator, the operation device 123 generates a rotation operation signal of the boom 131, a rotation operation signal of the arm 132, a rotation operation signal of the clam bucket 133, an opening/closing operation signal of the clam bucket 133, and a swing operation signal to the left and right of the swing body 120, and outputs the operation signals to a control device 128. The opening/closing operation signal of the clam bucket 133 is an example of a dumping operation signal for causing the bucket to dump earth. The opening/closing operation signal includes an opening operation signal and a closing operation signal. In addition, the operation device 123 generates a loading command signal for causing the work equipment 130 to start automatic loading control in accordance with the operation of the operator, and outputs the loading command signal to the control device 128. The operation device 123 is configured with, for example, a lever, a switch, and a pedal. The loading command signal is operated by operating a switch. For example, when the switch is ON, a loading command signal is output. The operation device 123 is disposed in the vicinity of the driver seat 122. The operation device 123 is positioned within a range that can be operated by the operator when the operator sits on the driver seat 122.

Examples of the detection device 124 include a stereo camera, a laser scanner, and an ultra-wide band (UWB) distance measuring device. The detection device 124 is provided such that the detecting direction faces the front of the cab 121 of the loading machine 100, for example. The detection device 124 specifies the three-dimensional position of the object in a coordinate system with the position of the detection device 124 as a reference.

In addition, the loading machine 100 according to the first embodiment is operated according to the operation of the operator who sits on the driver seat 122, but is not limited thereto in another embodiment. For example, the loading machine 100 according to another embodiment may be operated by transmitting an operation signal or a loading command signal by a remote operation of an operator who operates outside the loading machine 100.

The loading machine 100 includes a position and azimuth direction calculator 125, an inclination measuring device 126, a hydraulic device 127, and the control device 128.

The position and azimuth direction calculator 125 calculates the position of the swing body 120 and the azimuth direction in which the swing body 120 faces. The position and azimuth direction calculator 125 includes two receivers that receive positioning signals from artificial satellites that configure a GNSS. The two receivers are respectively installed at different positions on the swing body 120. Based on the positioning signal received by the receiver, the position and azimuth direction calculator 125 detects the position of the representative point (the origin of the shovel coordinate system) of the swing body 120 in a field coordinate system.

The position and azimuth direction calculator 125 calculates the azimuth direction in which the swing body 120 faces as a relationship between the installation position of one receiver and the installation position of the other receiver by using each positioning signal received by the two receivers. The azimuth direction in which the swing body 120 faces is a direction orthogonal to a front surface of the swing body 120 and is equal to a horizontal component of an extending direction of a straight line that extends from the boom 131 of the work equipment 130 to the clam bucket 133.

The inclination measuring device 126 measures an acceleration and an angular velocity of the swing body 120 and detects the posture (for example, roll angle, pitch angle, yaw angle) of the swing body 120 based on the measurement result. The inclination measuring device 126 is installed on a lower surface of the swing body 120, for example. For example, an inertial measurement unit (IMU) can be used as the inclination measuring device 126.

The hydraulic device 127 includes a hydraulic oil tank, a hydraulic pump, and a flow control valve. The hydraulic pump is driven by the power of an engine (not shown) and supplies the hydraulic oil to a traveling hydraulic motor (not shown) that causes the traveling body 110 to travel via the flow control valve, a swinging hydraulic motor (not shown) that swings the swing body 120, the boom cylinder 134, the arm cylinder 135, the bucket cylinder 136, and the clam cylinder 137. The flow control valve has a rod-shaped spool and adjusts the flow rate of the hydraulic oil supplied to the traveling hydraulic motor, the swinging hydraulic motor, the boom cylinder 134, the arm cylinder 135, the bucket cylinder 136, and the clam cylinder 137 according to the position of the spool. The spool is driven based on a control command received from the control device 128. In other words, the amount of hydraulic oil supplied to the traveling hydraulic motor, the swinging hydraulic motor, the boom cylinder 134, the arm cylinder 135, the bucket cylinder 136, and the clam cylinder 137 is controlled by the control device 128. As described above, the boom cylinder 134, the arm cylinder 135, the bucket cylinder 136, and the clam cylinder 137 are driven by the hydraulic oil supplied from the common hydraulic device 127.

The control device 128 receives the operation signal from the operation device 123. The control device 128 drives the work equipment 130, the swing body 120, or the traveling body 110 based on the received operation signal.

<<Configuration of Control Device>>

Figure 2:
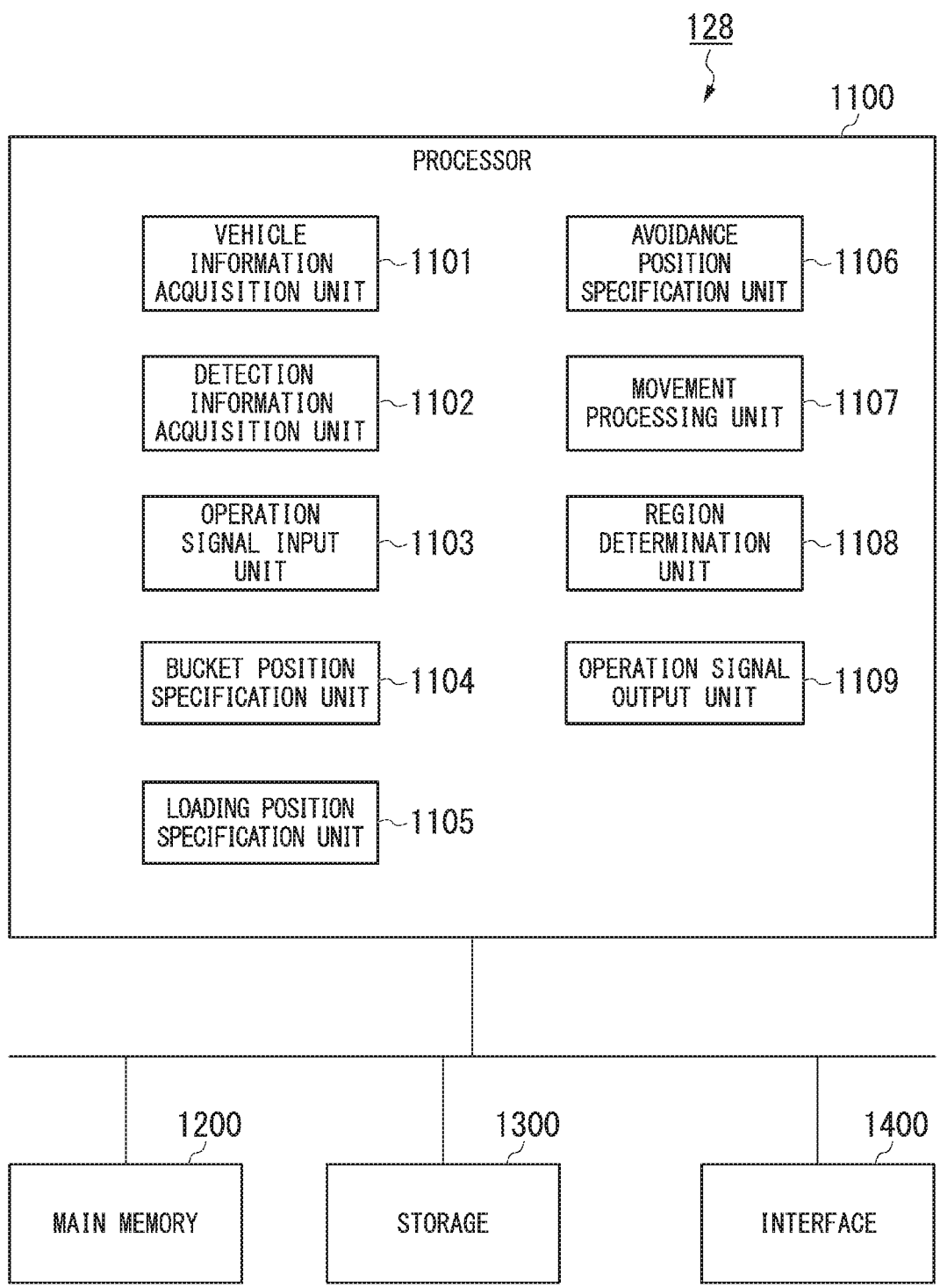
FIG. 2 is a schematic block diagram showing a configuration of a control device according to the first embodiment.

FIG. 2 is a schematic block diagram showing a configuration of the control device according to the first embodiment.

The control device 128 is a computer including a processor 1100, a main memory 1200, a storage 1300, and an interface 1400. The storage 1300 stores a program. The processor 1100 reads the program from the storage 1300, loads the program in the main memory 1200, and executes processing according to the program.

Examples of the storage 1300 include HDDs, SSDs, magnetic disks, magneto-optical disks, CD-ROMs, DVD-ROMs, and the like. The storage 1300 may be an internal medium directly connected to a common communication line of the control device 128, or may be an external medium connected to the control device 128 via the interface 1400. The storage 1300 is a tangible storage medium that is not temporary.

The processor 1100 is executed by a program and includes a vehicle information acquisition unit 1101, a detection information acquisition unit 1102, an operation signal input unit 1103, a bucket position specification unit 1104, a loading position specification unit 1105, an avoidance position specification unit 1106, a movement processing unit 1107, a region determination unit 1108, and an operation signal output unit 1109.

The vehicle information acquisition unit 1101 acquires the swing speed, the position, and the azimuth direction of the swing body 120, the inclination angles of the boom 131, the arm 132, and the clam bucket 133, the traveling speed of the traveling body 110, and the posture of the swing body 120. Hereinafter, information on the loading machine 100 acquired by the vehicle information acquisition unit 1101 will be referred to as vehicle information.

The detection information acquisition unit 1102 acquires three-dimensional position information from the detection device 124 and specifies the position and the shape of the loading object 200 (for example, a transport vehicle or a hopper).

The operation signal input unit 1103 receives an operation signal input from the operation device 123. A rotation operation signal of the boom 131, a rotation operation signal of the arm 132, a rotation operation signal of the clam bucket 133, an opening/closing operation signal of the clam bucket 133, a swing operation signal of the swing body 120, a traveling operation signal of the traveling body 110, and a loading command signal of the loading machine 100 are included.

Figure 3:
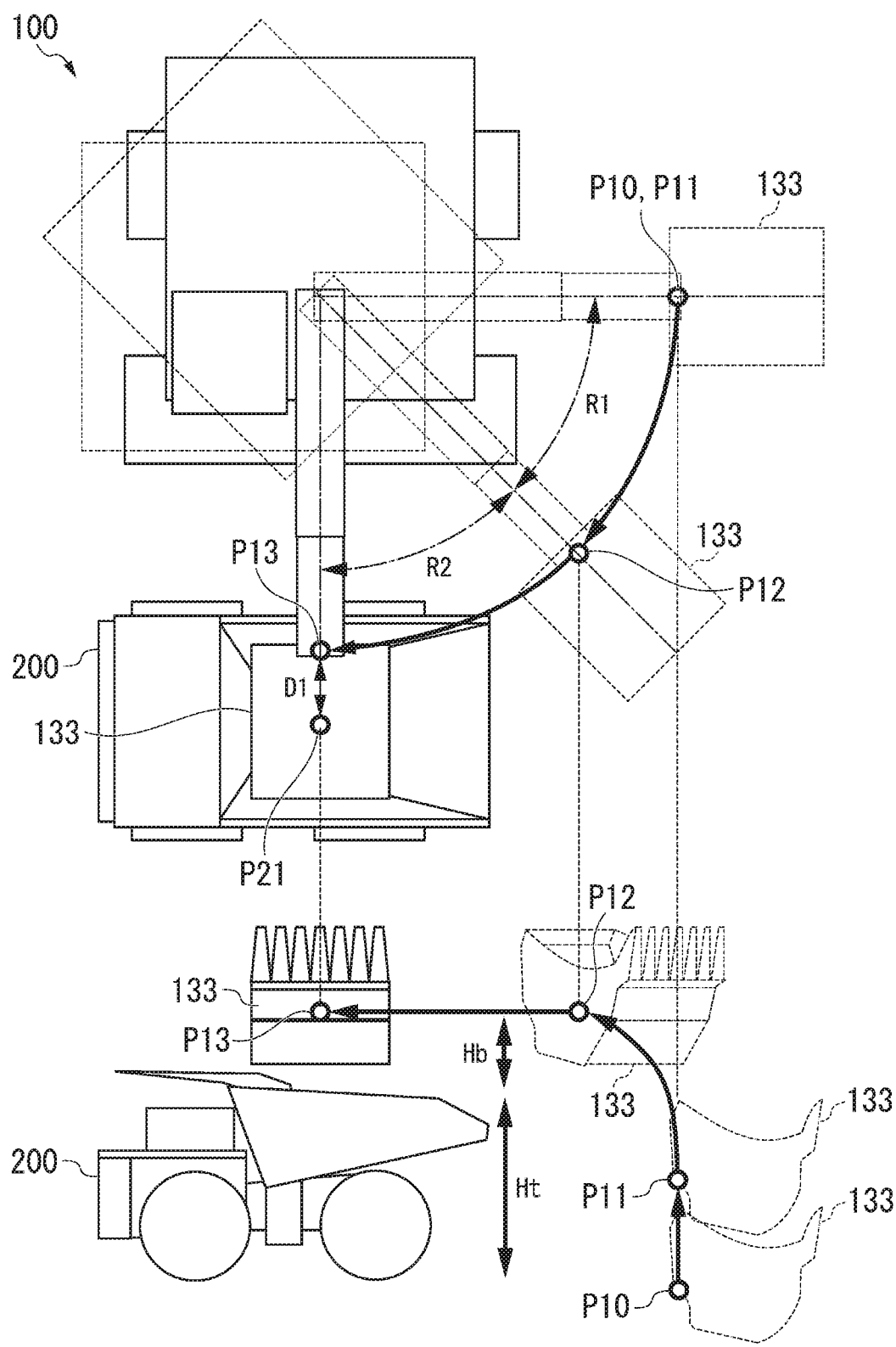
FIG. 3 is a view showing an example of a bucket path according to the first embodiment.

Based on the vehicle information acquired by the vehicle information acquisition unit 1101, the bucket position specification unit 1104 specifies a position P of the tip of the arm 132 in the shovel coordinate system and a height Hb from the tip of the arm 132 to the lowest point of the clam bucket 133. The lowest point of the clam bucket 133 means a point having the shortest distance from a ground surface in the outer shape of the clam bucket 133. In particular, the bucket position specification unit 1104 specifies the position P of the tip of the arm 132 when the input of the loading command signal is received as an excavation completion position P10. FIG. 3 is a diagram showing an example of a bucket path according to the first embodiment. Specifically, the bucket position specification unit 1104 obtains vertical direction components and horizontal direction components of the length of the boom 131 based on the inclination angle of the boom 131 and the known length (the distance from the pin of the base end portion to the pin at the tip end portion) of the boom 131. Similarly, the bucket position specification unit 1104 obtains the vertical direction component and the horizontal direction components of the length of the arm 132. The bucket position specification unit 1104 specifies a position separated from the position of the loading machine 100 by the sum of the vertical direction components and the sum of horizontal direction components of the lengths of the boom 131 and the arm 132, in the direction specified from the azimuth direction and posture of the loading machine 100, as the position P (position P of the pin of the tip end portion of the arm 132 shown in FIG. 1) of the tip of the arm 132. Further, the bucket position specification unit 1104 specifies the lowest point in the vertical direction of the clam bucket 133 based on the inclination angle of the clam bucket 133 and the known shape of the clam bucket 133 and specifies the height Hb from the tip of the arm 132 to the lowest point.

The loading position specification unit 1105 specifies a loading position P13 based on the position and the shape of the loading object 200 specified by the detection information acquisition unit 1102 in a case where the loading command signal is input to the operation signal input unit 1103. The loading position specification unit 1105 converts a loading point P21 indicated by the position information of the loading object 200 from the field coordinate system to the shovel coordinate system based on the position, the azimuth direction, and the posture of the swing body 120 acquired by the vehicle information acquisition unit 1101. The loading position specification unit 1105 specifies a position separated from the specified loading point P21 by a distance D from the center of the clam bucket 133 to the tip of the arm 132 in the direction in which the swing body 120 of the loading machine 100 faces, as a plane position of the loading position P13. In other words, when the tip of the arm 132 is positioned at the loading position P13, the center of the clam bucket 133 is positioned at the loading point P21. Therefore, the control device 128 can move the center of the clam bucket 133 to the loading point P21 by controlling the tip of the arm 132 to move to the loading position P13. The loading position specification unit 1105 specifies a height of the loading position P13 by adding the height Hb from the tip of the arm 132 specified by the bucket position specification unit 1104 to the lowest point of the clam bucket 133 and the height for the control margin of the clam bucket 133 to a height Ht of the loading object 200. In another embodiment, the loading position specification unit 1105 may specify the loading position P13 without adding the height for the control margin. In other words, the loading position specification unit 1105 may specify the height of the loading position P13 by adding the height Hb to the height Ht.

The avoidance position specification unit 1106 specifies an interference avoidance position P12 that is a point at which the work equipment 130 and the loading object 200 do not interfere with each other in a plan view from above based on the loading position P13 specified by the loading position specification unit 1105, the position of the loading machine 100 acquired by the vehicle information acquisition unit 1101, and the position and the shape of the loading object 200 specified by the detection information acquisition unit 1102. The interference avoidance position P12 is a position at which the height thereof is the same height as the loading position P13, the distance from the center of swing of the swing body 120 is equal to the distance from the center of swing to the loading position P13, and the loading object 200 is not present therebelow. The avoidance position specification unit 1106 specifies, for example, a circle which is centered on the center of swing of the swing body 120 and the radius of which is the distance between the center of swing and the loading position P13, and specifies a position at which the outer shape of the clam bucket 133 does not interfere with the loading object 200 in a plan view from above among the positions on the circle and which is the closest to the loading position P13 as the interference avoidance position P12. The avoidance position specification unit 1106 can determine whether or not the loading object 200 and the clam bucket 133 interfere with each other based on the position and the shape of the loading object 200 and the known shape of the clam bucket 133. Here, "the same height" and "the distances are equal" are not necessarily limited to those in which the heights or distances completely match each other and some errors and margins are allowed.

In a case where the operation signal input unit 1103 receives the input of the loading command signal, the movement processing unit 1107 generates the rotation operation signal for moving the clam bucket 133 to the loading position P13 based on the loading position P13 specified by the loading position specification unit 1105 and the interference avoidance position P12 specified by the avoidance position specification unit 1106. In other words, the movement processing unit 1107 generates the rotation operation signal so as to reach the loading position P13 from the excavation completion position P10 via a swing start position P11 and the interference avoidance position P12. Further, the movement processing unit 1107 generates the rotation operation signal for the clam bucket 133 such that a ground angle of the clam bucket 133 does not change even when the boom 131 and the arm 132 are driven.

The region determination unit 1108 determines whether the azimuth direction in which the swing body 120 faces is in a first region R1 that does not allow the dumping operation or a second region R2 that allows the dumping operation. The first region R1 is a region from an azimuth direction (starting point azimuth direction) in which the swing body 120 faces when the input of the loading command signal is received to an azimuth direction (reference azimuth direction) in which the swing body 120 faces when the work equipment 130 is positioned at the interference avoidance position P12. The second region R2 is a region from the reference azimuth direction to an azimuth direction (end point azimuth direction) in which the swing body 120 faces when the work equipment 130 is positioned at the loading position P13.

The operation signal output unit 1109 outputs the operation signal input to the operation signal input unit 1103 and the operation signal generated by the movement processing unit 1107. Specifically, the operation signal output unit 1109 outputs the operation signal generated by the movement processing unit 1107 in a case where the automatic loading control is being performed and outputs the operation signal input to the operation signal input unit 1103 in a case where the automatic loading control is not being performed. Further, even in a case where the automatic loading control is being performed, in a case where the swing body 120 faces the azimuth direction included in the second region R2, the operation signal output unit 1109 outputs the opening operation signal of the clam bucket 133 input to the operation signal input unit 1103.

<<Operation>>

When the operator of the loading machine 100 determines that the loading machine 100 and the loading object 200 are in a positional relationship that allows loading processing, the operator switches on the operation device 123. Accordingly, the operation device 123 generates and outputs a loading command signal.

Figure 4:
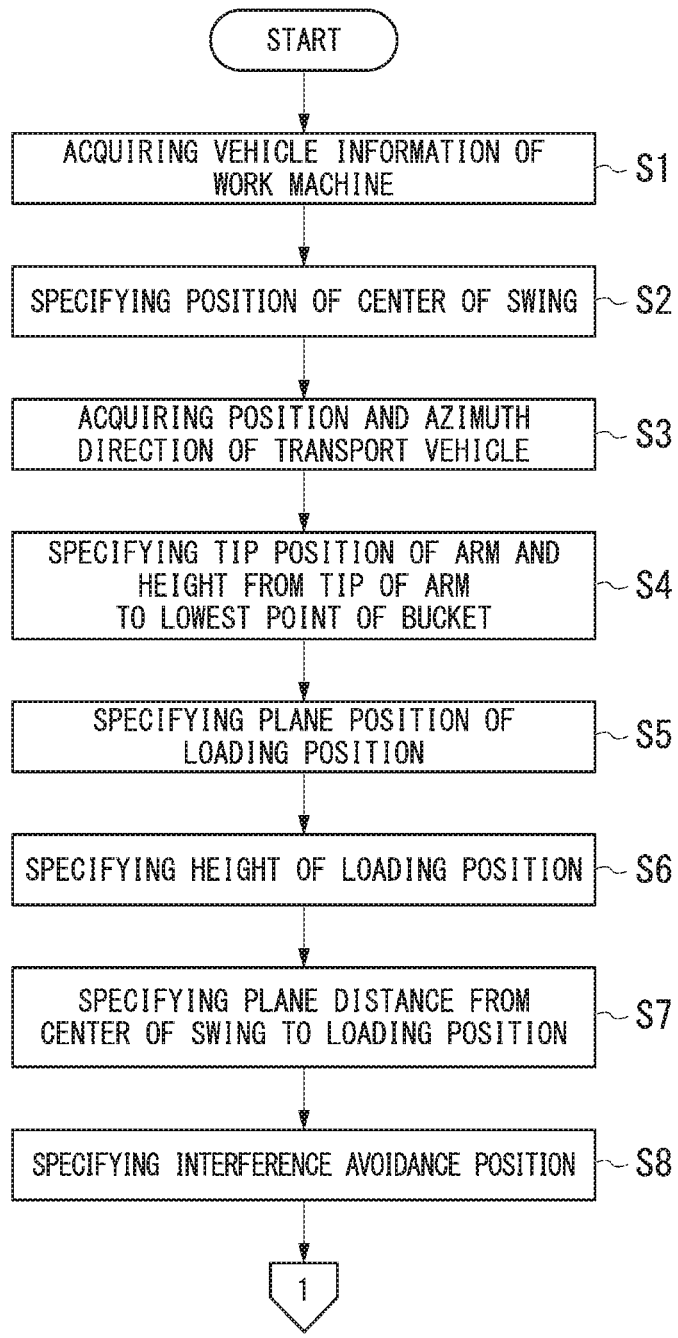
FIG. 4 is a flowchart showing an automatic loading control method according to the first embodiment.
Figure 5:
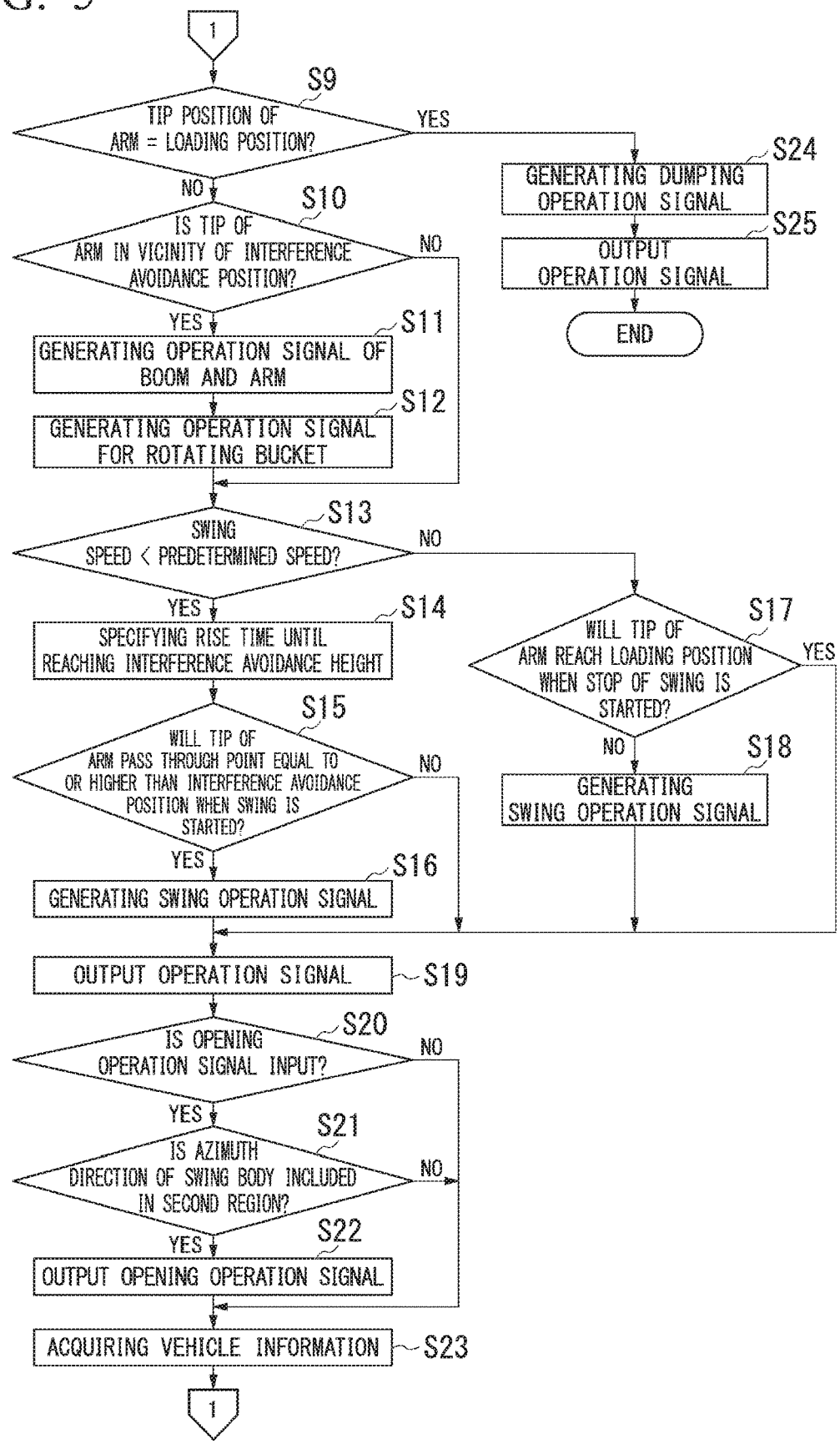
FIG. 5 is a flowchart showing the automatic loading control method according to the first embodiment.

FIGS. 4 and 5 are flowcharts showing the automatic loading control method according to the first embodiment. When receiving the input of the loading command signal from the operator, the control device 128 executes the automatic loading control shown in FIGS. 4 and 5.

The vehicle information acquisition unit 1101 acquires the position and the azimuth direction of the swing body 120, the inclination angles of the boom 131, the arm 132, and the clam bucket 133, the posture of the swing body 120 (step S1). The vehicle information acquisition unit 1101 specifies the position of the center of swing of the swing body 120 based on the acquired position and the azimuth direction of the swing body 120 (step S2). Then, the detection information acquisition unit 1102 acquires the three-dimensional position information of the loading object 200 from the detection device 124, and specifies the position and the shape of the loading object 200 from the three-dimensional position information (step S3).

Based on the vehicle information acquired by the vehicle information acquisition unit 1101, the bucket position specification unit 1104 specifies the position P of the tip of the arm 132 when the loading command signal is input, and the height from the tip of the arm 132 to the lowest point of the clam bucket 133 (step S4). The bucket position specification unit 1104 specifies the position P as the excavation completion position P10.

The loading position specification unit 1105 converts the position information of the loading object 200 acquired by the detection information acquisition unit 1102 from the field coordinate system to the shovel coordinate system based on the position, the azimuth direction, and the posture of the swing body 120 acquired in step S1. The loading position specification unit 1105 specifies the plane position of the loading position P13 based on the position and the shape of the loading object 200 specified by the detection information acquisition unit 1102 (step S5). At this time, the loading position specification unit 1105 specifies the height of the loading position P13 by adding the height Hb from the tip of the arm 132 specified in step S4 to the lowest point of the clam bucket 133 and the height for the control margin of the clam bucket 133, to the height Ht of the loading object 200 (step S6).

The avoidance position specification unit 1106 specifies the position of the center of swing of the swing body 120 based on the position and the azimuth direction of the swing body 120 acquired by the vehicle information acquisition unit 1101 (step S7). The avoidance position specification unit 1106 specifies the position separated from the center of swing by the specified plane distance, that is, the position at which the outer shape of the clam bucket 133 does not interfere with the loading object 200 in a plan view and which is the closest to the loading position P13, as the interference avoidance position P12 (step S8).

The movement processing unit 1107 determines whether or not the position of the tip of the arm 132 has reached the loading position P13 (step S9). In a case where the position of the tip of the arm 132 has not reached the loading position P13 (step S9: NO), the movement processing unit 1107 determines whether or not the position of the tip of the arm 132 is in the vicinity of the interference avoidance position P12 (step S10). For example, the movement processing unit 1107 determines whether or not a difference between the height of the tip of the arm 132 and the height of the interference avoidance position P12 is less than a predetermined threshold value, or a difference between the plane distance from the center of swing of the swing body 120 to the tip of the arm 132 and the plane distance from the center of swing to the interference avoidance position P12 is less than a predetermined threshold value (step S10). In a case where the position of the tip of the arm 132 is in the vicinity of the interference avoidance position P12 (step S10: YES), the movement processing unit 1107 generates the operation signal for raising the boom 131 and the arm 132 to the height of the interference avoidance position P12 (step S11). At this time, the movement processing unit 1107 generates the operation signal based on the positions and speeds of the boom 131 and the arm 132.

In addition, the movement processing unit 1107 calculates the sum of the angular velocities of the boom 131 and the arm 132 based on the generated operation signals of the boom 131 and the arm 132 and generates the operation signal for rotating the clam bucket 133 at the same speed as the sum of the angular velocities (step S12). Accordingly, the movement processing unit 1107 can generate the operation signal for holding the ground angle of the clam bucket 133. In another embodiment, the movement processing unit 1107 may generate the operation signal for rotating the clam bucket 133 such that the ground angle of the clam bucket 133 obtained by calculating from the detected values of the boom angle sensor 138, the arm angle sensor 139, and the bucket angle sensor 140 becomes equal to the ground angle when the automatic control is started.

In a case where the position of the tip of the arm 132 is not in the vicinity of the interference avoidance position P12 (step S10: NO), the movement processing unit 1107 does not generate operation signals of the boom 131, the arm 132, and the clam bucket 133. In other words, in a case where the position of the tip of the arm 132 is not in the vicinity of the interference avoidance position P12, the movement processing unit 1107 prohibits the output of the operation signal of the work equipment 130 for moving the work equipment 130 to the loading point.

The movement processing unit 1107 determines whether or not the swing speed of the swing body 120 is lower than a predetermined speed based on the vehicle information acquired by the vehicle information acquisition unit 1101 (step S13). In other words, the movement processing unit 1107 determines whether or not the swing body 120 is swinging.

In a case where the swing speed of the swing body 120 is lower than the predetermined speed (step S13: YES), the movement processing unit 1107 specifies a rise time which is time for the height of the clam bucket 133 to reach the height of the interference avoidance position P12 from the height of the excavation completion position P10 (step S14). In a case where the swing operation signal is output at the current timing based on the rise time of the clam bucket 133, the movement processing unit 1107 determines whether or not the tip of the arm 132 passes through the interference avoidance position P12 or a point higher than the interference avoidance position P12 (step S15). In a case where the swing operation signal is output at the current timing, and in a case where the tip of the arm 132 passes through the interference avoidance position P12 or the point higher than the interference avoidance position P12 (step S15: YES), the movement processing unit 1107 generates the swing operation signal (step S16).

In a case where the swing operation signal is output at the current timing, and in a case where the tip of the arm 132 passes through a point lower than the interference avoidance position P12 (step S15: NO) the movement processing unit 1107 does not generate the swing operation signal. In other words, in a case where the tip of the arm 132 passes through a point lower than the interference avoidance position P12, the movement processing unit 1107 prohibits the output of the swing operation signal.

In a case where the swing speed of the swing body 120 is equal to or higher than the predetermined speed (step S13: NO), the movement processing unit 1107 determines whether or not the tip of the arm 132 will reach the loading position P13 in a case where the output of the swing operation signal is stopped at the current timing (step S17). The swing body 120 continues to swing due to inertia while decelerating after stopping the output of the swing operation signal, and then stops. In a case where the output of the swing operation signal is stopped at the current timing, and in a case where the tip of the arm 132 will reach the loading position P13 (step S17: YES), the movement processing unit 1107 does not generate the swing operation signal. In other words, in a case where the output of the swing operation signal is stopped at the current timing, and in a case where the tip of the arm 132 will reach the loading position P13, the movement processing unit 1107 prohibits the output of the swing operation signal. Accordingly, the swing body 120 starts decelerating.

On the other hand, in a case where the output of the swing operation signal is stopped at the current timing, and in a case where the tip of the arm 132 will stop before the loading position P13 (step S17: NO) the movement processing unit 1107 generates the swing operation signal (step S18).

When at least one of the rotation operation signals of the boom 131, the arm 132, and the clam bucket 133 and the swing operation signal of the swing body 120 is generated by the processing from step S9 to step S18, the operation signal output unit 1109 outputs the generated operation signal to the hydraulic device 127 (step S19).

Next, the operation signal input unit 1103 determines whether or not the input of the opening operation signal for the clam bucket 133 has been received from the operation device 123 (step S20). In a case where the input of the opening operation signal of the clam bucket 133 is not received from the operation device 123 (step S20: NO), the operation signal output unit 1109 does not output the opening operation signal.

On the other hand, in a case where the input of the opening operation signal of the clam bucket 133 is received from the operation device 123 (step S20: YES), the region determination unit 1108 determines whether or not the azimuth direction in which the swing body 120 faces is included in the second region R2 from the reference azimuth direction to the end point azimuth direction (step S21). In a case where the azimuth direction in which the swing body 120 faces is included in the first region R1 (step S21: NO), the operation signal output unit 1109 does not output the input opening operation signal to the hydraulic device 127. In other words, in a case where the azimuth direction in which the swing body 120 faces is included in the first region R1, the operation signal output unit 1109 prohibits the output of the opening operation signal. On the other hand, in a case where the azimuth direction in which the swing body 120 faces is included in the second region R2 (step S21: YES), the operation signal output unit 1109 outputs the input opening operation signal to the hydraulic device 127 (step S22).

In addition, in a case where the azimuth direction in which the swing body 120 faces is included in the second region R2, the height of the tip of the arm 132 becomes the height equal to or higher than the interference avoidance position P12. This is because, in steps S15 and S16, when the tip of the arm 132 is positioned at the interference avoidance position P12 in a plan view from above, the movement processing unit 1107 generates the swing operation signal such that the height of the tip of the arm 132 becomes equal to or higher than the interference avoidance position P12. The azimuth direction in which the swing body 120 faces when the tip of the arm 132 is positioned at the interference avoidance position P12 in a plan view from above is equal to the reference azimuth direction.

In addition, in a case where the azimuth direction in which the swing body 120 faces is included in the first region R1, the height of the tip of the arm 132 is not necessarily limited to the height less than the interference avoidance position. For example, in a case where the time required to raise the height of the arm 132 to the height equal to or higher than the interference avoidance position P12 is shorter than the time required for swinging the swing body 120 until the tip of the arm 132 is positioned at the interference avoidance position P12 in a plan view from above, when the height of the tip of the arm 132 rises to the height equal to or higher than the interference avoidance position P12, there is a possibility that the azimuth direction in which the swing body 120 faces is included in the first region R1.

Then, the vehicle information acquisition unit 1101 acquires the vehicle information (step S23). Accordingly, the vehicle information acquisition unit 1101 can acquire the vehicle information after operating by the output operation signal. The control device 128 returns the process to step S9, and repeatedly executes generation of the operation signal.

On the other hand, in a case where the position of the tip of the arm 132 has reached the loading position P13 in step S9 (step S9: YES), the movement processing unit 1107 generates the operation signal for opening the clam bucket 133 (step S24). The operation signal output unit 1109 outputs the generated operation signal to the hydraulic device 127 (step S25). Then, the control device 128 ends the automatic loading control.

Here, an operation of the loading machine 100 at the time of the automatic loading control will be described using FIG. 3.

When the automatic loading control is started, the boom 131 and the arm 132 rises from the excavation completion position P10 toward the swing start position P11. At this time, the clam bucket 133 is driven so as to maintain the ground angle at the end of excavation. In addition, since the azimuth direction in which the swing body 120 faces is included in the first region R1 at this time, even when the opening/closing operation signal of the clam bucket 133 is input to the operation device 123, the opening/closing operation signal is not output to the hydraulic device 127. Accordingly, the control device 128 can prevent earth from being accidentally dumped and spilling out of the loading object.

In the control device 128, when the tip of the arm 132 reaches the swing start position P11, the swing body 120 starts swinging toward the loading position P13. At this time, since the tip of the arm 132 has not reached the height of the interference avoidance position P12, the boom 131 and the arm 132 continue to rise. While the tip of the arm 132 moves from the swing start position P11 to the interference avoidance position P12, the boom 131, the arm 132, and the clam bucket 133 are decelerated such that the height of the tip of the arm 132 becomes equal to the interference avoidance position P12. In addition, since the azimuth direction in which the swing body 120 faces is included in the first region R1 at this time, even when the opening/closing operation signal of the clam bucket 133 is input to the operation device 123, the opening/closing operation signal is not output to the hydraulic device 127. Accordingly, the control device 128 can prevent earth from being accidentally dumped and spilling out of the loading object.

When the tip of the arm 132 comes to the interference avoidance position P12, the driving of the work equipment 130 stops. Meanwhile, the swing body 120 continues swinging. In other words, between the interference avoidance position P12 and the loading position P13, the tip of the arm 132 moves only by swinging the swing body 120 without driving the work equipment 130. While the tip of the arm 132 moves from the swing start position P11 to the loading position P13, the swing body 120 is decelerated such that the position of the tip of the arm 132 becomes equal to the loading position P13. Since the azimuth direction in which the swing body 120 faces is included in the second region R2 at this time, when the opening/closing operation signal of the clam bucket 133 is input to the operation device 123, the clam bucket 133 is opened in accordance with the opening/closing operation signal. Accordingly, the operator can perform the dumping operation before the clam bucket 133 reaches the loading position P13 in order to shorten the cycle time.

When the tip of the arm 132 comes to the loading position P13, the driving of the work equipment 130 and the swing body 120 stops. Thereafter, the clam bucket 133 is opened regardless of presence/absence of the input of the opening/closing operation signal.

By the above-described automatic loading control, the loading machine 100 can load the earth scooped by the clam bucket 133 onto the loading object 200. The operator repeatedly executes excavation by the work equipment 130 and the automatic loading control by inputting the loading command signal such that the loading amount of the loading object 200 does not exceed the maximum loading amount.

<<Action and Effect>>

In a case where the azimuth direction in which the swing body 120 faces is included in the first region R1 when the automatic loading control is being performed, even when the opening/closing operation signal of the clam bucket 133 is received, the control device 128 of the loading machine 100 according to the first embodiment does not output the opening/closing operation signal to the hydraulic device 127. Accordingly, the control device 128 can prevent earth from being spilled from the loading object 200.

On the other hand, in a case where the azimuth direction in which the swing body 120 faces is included in the second region R2 when the automatic loading control is being performed, when the opening/closing operation signal of the clam bucket 133 is received, the control device 128 outputs the opening/closing operation signal to the hydraulic device 127. Accordingly, the operator can perform the dumping operation before the clam bucket 133 reaches the loading position P13 in order to shorten the cycle time.

In the first embodiment, the first region R1 is a region where the work equipment 130 and the loading object 200 do not interfere with each other in a plan view from above as shown in FIG. 3. Accordingly, the control device 128 can prevent the clam bucket 133 from discharging when there is no loading object 200 under the work equipment 130. Even when the clam bucket 133 starts to open at the interference avoidance position P12 that is not above a loading platform, the possibility of spilling earth from the loading object 200 is low. This is because the clam bucket 133 is swinging at a predetermined speed with a higher trajectory than the loading platform, and since there is a time lag when the opening operation signal is output and the clam bucket 133 actually starts to open, earth are dumped in the swinging direction from the position on the loading object 200 side of the interference avoidance position P12.

In addition, the control device 128 according to the first embodiment outputs an up/down operation signal of the work equipment 130 when the azimuth direction in which the swing body 120 faces is in the first region R1 and does not output the up/down operation signal of the work equipment 130 when the azimuth direction in which the swing body 120 faces is in the second region R2. In other words, the control device 128 does not output the opening/closing operation signal to the hydraulic device 127 while outputting the up/down operation signal of the work equipment 130 to the hydraulic device 127. As described above, the boom cylinder 134, the arm cylinder 135, the bucket cylinder 136, and the clam cylinder 137 are driven by the hydraulic oil supplied from the common hydraulic device 127. Therefore, the maximum flow rate of the hydraulic oil that can flow to the boom cylinder 134, the arm cylinder 135, the bucket cylinder 136, and the clam cylinder 137 is determined by the capability of the hydraulic device 127. Therefore, when the clam cylinder 137 is operated while the work equipment 130 is being raised, the flow rate of the hydraulic oil that flows to the boom cylinder 134, the arm cylinder 135, and the bucket cylinder 136 is reduced, and the rise speed of the work equipment 130 decreases. When the rise speed of the work equipment 130 decreases, there is a possibility that the work equipment 130 interferes with the loading object 200.

Therefore, the control device 128 can prevent the rise of the work equipment 130 from being delayed by not outputting the opening/closing operation signal to the hydraulic device 127 while outputting the up/down operation signal of the work equipment 130 to the hydraulic device 127.

Above, the embodiment has been described in detail with reference to the drawings, but the specific configuration is not limited to the above-described configuration, and various design changes can be made.

For example, in the first embodiment, the reference azimuth direction is the azimuth direction in which the swing body 120 faces when the work equipment 130 is positioned at the interference avoidance position P12, but is not limited thereto. For example, in another embodiment, the reference azimuth direction may be the azimuth direction closest to the starting point azimuth direction among the azimuth directions where the tip of the arm 132 interferes with the loading object 200 in a plan view from above. In addition, in another embodiment, the reference azimuth direction may be set to any azimuth direction on the starting point azimuth direction side among the azimuth directions where the tip of the arm 132 interferes with the loading object 200 in a plan view from above. In addition, in another embodiment, the reference azimuth direction may be set to any azimuth direction on the end point azimuth direction side among the azimuth directions where the tip of the arm 132 does not interfere with the loading object 200 in a plan view from above. In this case, the tip of the arm 132 may not necessarily be raised to the height of the interference avoidance position P12 in the reference azimuth direction. In other words, the reference azimuth direction may be set at any position in the vicinity of the interference avoidance position P12.

In addition, although the loading machine 100 according to the first embodiment includes the clam bucket 133, but the invention is not limited thereto. For example, the loading machine 100 according to another embodiment may include an integrated bucket in which the backhaul 1331 and the clamshell 1332 are not opened and closed. The dumping operation signal in this case is an operation signal for rotating the bucket to the back side (in the dumping direction).

Further, the automatic loading control according to the first embodiment is terminated by outputting the operation signal for opening the clam bucket 133 in step S25, but the invention is not limited thereto. For example, the control device 128 according to another embodiment may output the operation signal for closing the clam bucket 133 after the time required from the output of the operation signal for opening the clam bucket 133 in step S22 or step S25 until all the earth contained in the clam bucket 133 is dump has elapsed.

Moreover, although the loading machine 100 according to the first embodiment is a manned driving vehicle which an operator boards and operates, but the invention is not limited thereto. For example, the loading machine 100 according to another embodiment may be a remotely operated vehicle that is operated by an operation signal acquired by communication from a remote operation device that is operated by an operator in a remote office while looking at a monitor screen. In this case, some functions of the control device 128 may be provided in the remote operation device.

Industrial Applicability

The loading machine control device according to the present invention can receive the dumping operation by the automatic loading control and prevent earth from spilling from the loading object.

The invention claimed is:

1. A control device for controlling a loading machine including a swing body that swings around a center of swing and a work equipment that is attached to the swing body and has a bucket, the control device comprising:
    an operation signal input unit that is configured to receive an input of a dumping operation signal and a loading command signal for causing the bucket to dump earth from an operator; and an operation signal output unit that is configured to:
: output an operation signal of the work equipment and the swing body for moving the bucket to a loading point in a case where the loading command signal is received,
: prohibit an output of the dumping operation signal when the dumping operation signal is received, in a case where an azimuth direction in which the swing body faces is included in a first region from a starting point azimuth direction to a predetermined reference azimuth direction, the starting point azimuth direction being an azimuth direction in which the swing body faces when the loading command signal is received, and
: output the dumping operation signal when the dumping operation signal is received, in a case where the azimuth direction in which the swing body faces is included in a second region from the reference azimuth direction to an end point azimuth direction which is an azimuth direction in which the swing body faces when the work equipment is positioned at the loading point.

2. The control device according to claim 1, wherein the first region is a region where the work equipment and a loading object do not interfere with each other in a plan view from above.

3. The control device according to claim 1, wherein the operation signal output unit outputs the operation signal of the work equipment for moving the work equipment to the loading point in a case of being included in the first region, and prohibits the output of the operation signal of the work equipment for moving the work equipment to the loading point in a case of being included in the second region.

4. A control device for controlling a loading machine including a swing body that swings around a center of swing and a work equipment that is attached to the swing body and has a bucket, the control device comprising:
: an operation signal input unit that is configured to receive an input of a dumping operation signal and a loading command signal for causing the bucket to dump earth from an operator; and
: an operation signal output unit that is configured to:
:: output an operation signal of the work equipment and the swing body for moving the bucket to a loading point in a case where the loading command signal is received, and
:: prohibit an output of the dumping operation signal when the dumping operation signal is received, in a case where an azimuth direction in which the swing body faces is included in a region from a starting point azimuth direction to a predetermined reference azimuth direction, the starting point azimuth direction being an azimuth direction in which the swing body faces when the loading command signal is received.

5. A control device for controlling a loading machine including a swing body that swings around a center of swing and a work equipment that is attached to the swing body and has a bucket, the control device comprising:
: an operation signal input unit that is configured to receive an input of a dumping operation signal and a loading command signal for causing the bucket to dump earth from an operator; and
: an operation signal output unit that is configured to:
:: output an operation signal of the work equipment and the swing body for moving the bucket to a loading point in a case where the loading command signal is received, and
:: output the dumping operation signal when the dumping operation signal is received in a case where an azimuth direction in which the swing body faces is included in a region from a predetermined reference azimuth direction to an end point azimuth direction which is an azimuth direction in which the swing body faces when the work equipment is positioned at the loading point.

6. A control method for controlling a loading machine including a swing body that swings around a center of swing and a work equipment that is attached to the swing body and has a bucket, the control method comprising the steps of:
: receiving a loading command signal from an operator;
: outputting an operation signal of the work equipment and the swing body for moving the work equipment to a loading point when the loading command signal is received;
: receiving an input of a dumping operation signal for causing the bucket to dump earth from the operator; and
: prohibiting an output of the dumping operation signal when the dumping operation signal is received in a case where an azimuth direction in which the swing body faces is included in a first region from a starting point azimuth direction to a predetermined reference azimuth direction, the starting point azimuth direction being an azimuth direction in which the swing body faces when the loading command signal is received, and
: outputting the dumping operation signal when the dumping operation signal is received in a case where the azimuth direction in which the swing body faces is included in a second region from the predetermined reference azimuth direction to an end point azimuth direction which is an azimuth direction in which the swing body faces when the work equipment is positioned at the loading point.

* * * * *